United States Patent
Redana et al.

(10) Patent No.: US 9,155,012 B2
(45) Date of Patent: Oct. 6, 2015

(54) METHOD, APPARATUS, AND RELATED COMPUTER PROGRAM PRODUCT FOR LOAD BALANCING IN A RELAY NETWORK

(75) Inventors: Simone Redana, Munich (DE); Bernhard Raaf, Neuried (DE); Juergen Michel, Munich (DE); Vinh Van Phan, Oulu (FI); Oumer Teyeb, Stockholm (SE); Ingo Viering, Munich (DE); Martin Doettling, Neubiberg (DE); Lei Du, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 275 days.

(21) Appl. No.: 13/265,921

(22) PCT Filed: Apr. 24, 2009

(86) PCT No.: PCT/EP2009/054972
§ 371 (c)(1),
(2), (4) Date: Nov. 21, 2011

(87) PCT Pub. No.: WO2010/121661
PCT Pub. Date: Oct. 28, 2010

(65) Prior Publication Data
US 2012/0063417 A1    Mar. 15, 2012

(51) Int. Cl.
*H04W 36/12* (2009.01)
*H04W 36/22* (2009.01)
*H04B 7/26* (2006.01)
*H04W 36/00* (2009.01)
*H04W 84/04* (2009.01)

(52) U.S. Cl.
CPC .............. *H04W 36/22* (2013.01); *H04W 36/12* (2013.01); *H04B 7/2606* (2013.01); *H04W 36/0055* (2013.01); *H04W 84/047* (2013.01)

(58) Field of Classification Search
CPC ..... H04W 36/12; H04W 36/00; H04W 36/04; H04W 36/08; H04W 36/14; H04W 36/24; H04W 36/30; H04W 36/38; H04W 48/00; H04W 48/20
USPC ......... 370/229, 230, 232, 235, 236, 237, 310, 370/315, 328, 329, 331, 332, 443; 455/403, 455/422.1, 424, 432, 436, 437, 438, 439, 455/443, 444, 445, 450, 451, 452.1, 7, 11.1, 455/561
See application file for complete search history.

(56) References Cited

U.S. PATENT DOCUMENTS

2010/0267387 A1* 10/2010 Stephens ........................ 455/436

FOREIGN PATENT DOCUMENTS

WO    WO 2007/119168 A2    10/2007

OTHER PUBLICATIONS

Qualcomm Europe: "Measurements in support of LTE-A Techniques" 3GPP Draft; R1-090859, 3rd Generation Partnership Project (3GPP), Mobile Competence Centre; 650, Route des Lucioles; F-06921 Sophia-Antipolis Cedex; France; no. Athens, Greece; 20090203, Feb. 3, 2009, XP050318709 [retrieved on Feb. 3, 2009].

(Continued)

*Primary Examiner* — Curtis A Alia
(74) *Attorney, Agent, or Firm* — Harrington & Smith

(57) ABSTRACT

It is disclosed a method (and related apparatus) including deciding a handover of a terminal from a relaying source entity to a relaying target entity based on information related to at least one link between the relaying source and target entities and source and target network access entities.

18 Claims, 13 Drawing Sheets

(56) References Cited

OTHER PUBLICATIONS

Gang Shen et al: "MS Handover Support in Transparent / Non-Transparent Relay Mode" Internet Citation, Jan. 8, 2007, pp. 1-8, XP002522417, Retrieved from the Internet: URL:http://wirelessman.org/relay/contrib/C80216j-07_146.pdf> [retrieved on Apr. 2, 2009], pp. 1,4-p. 5.

Ericsson: "A discussion on some technology components for LTE-Advanced", 3GPP Draft, R1-082024 (LTE-Advanced Technology Components), 3rd Generation Partnership Project (3GPP), Mobile Competence Centre; 650, Route des Lucioles; F-06921, Sophia-Antipolis Cedex; France; vol. RAN WG1, no. Kansas City, USA; 20080514, May 14, 2008, XP050110365 [retrieved on Aug. 14, 2008] section 2.5.

R1-082024, "A Discussion on Some Technology Components for LTE-Advanced" Ericsson, TSG RAN WG1 #53, Kansas City, MO, USA, May 5-9, 2008, 11 pgs.

R1-090859, "Measurements in Support of LTE-A Techniques", Qualcomm Europe, 3GPP TSG-RAN WG1 #56, Athens, Greece, Feb. 9-13, 2009, 2 pgs.

\* cited by examiner

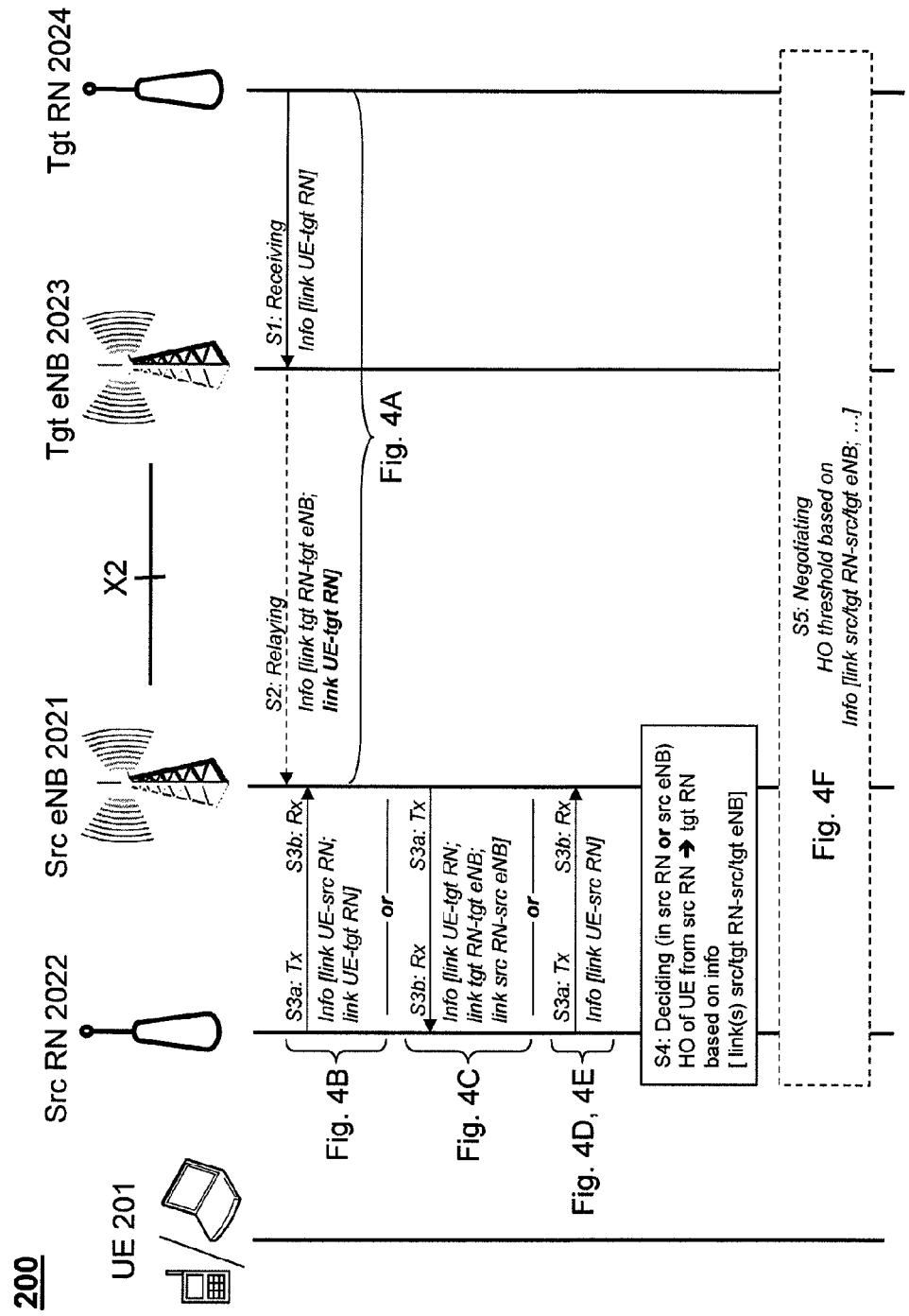

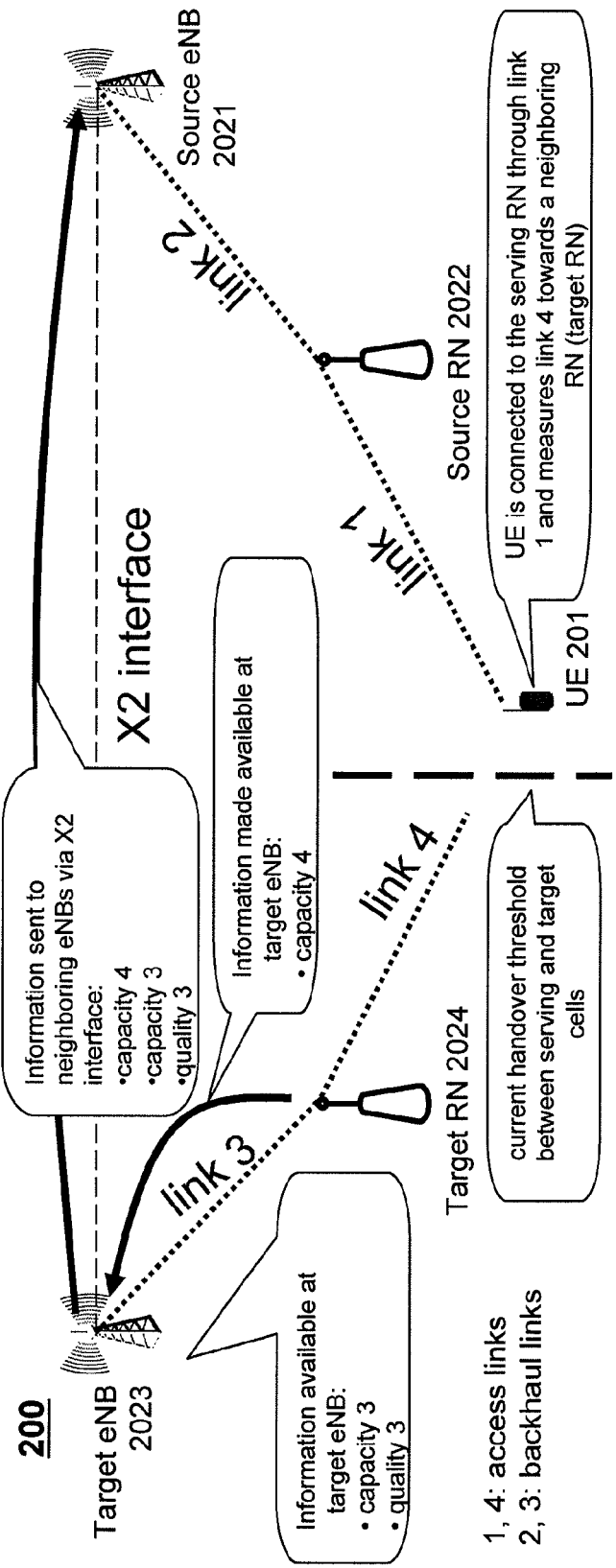

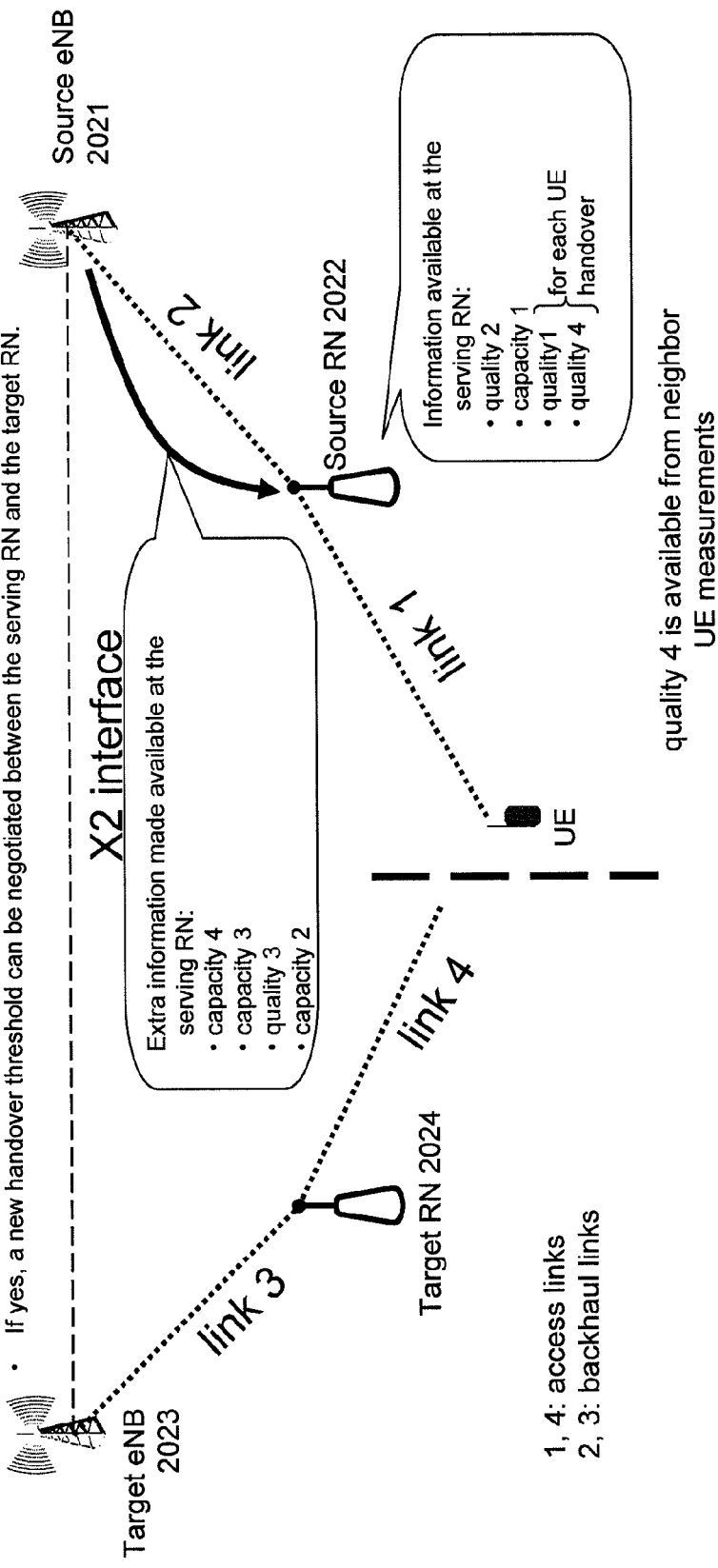

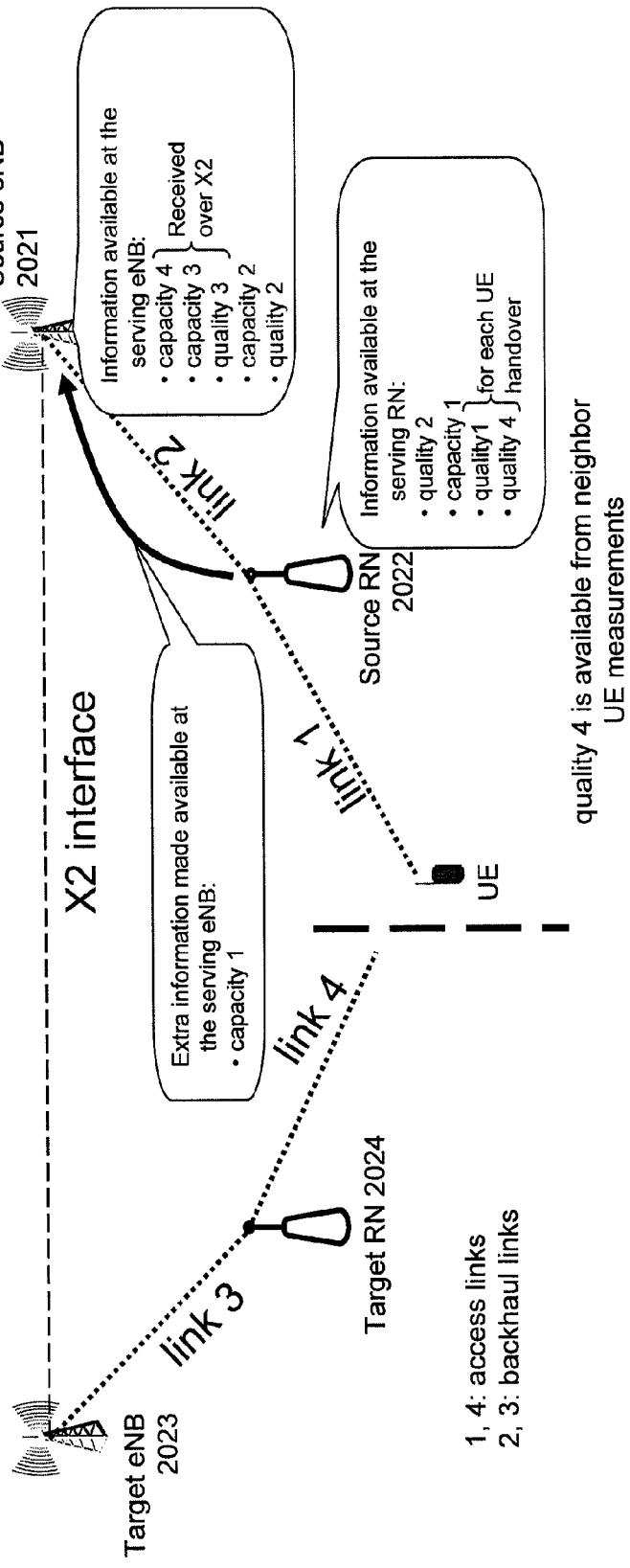

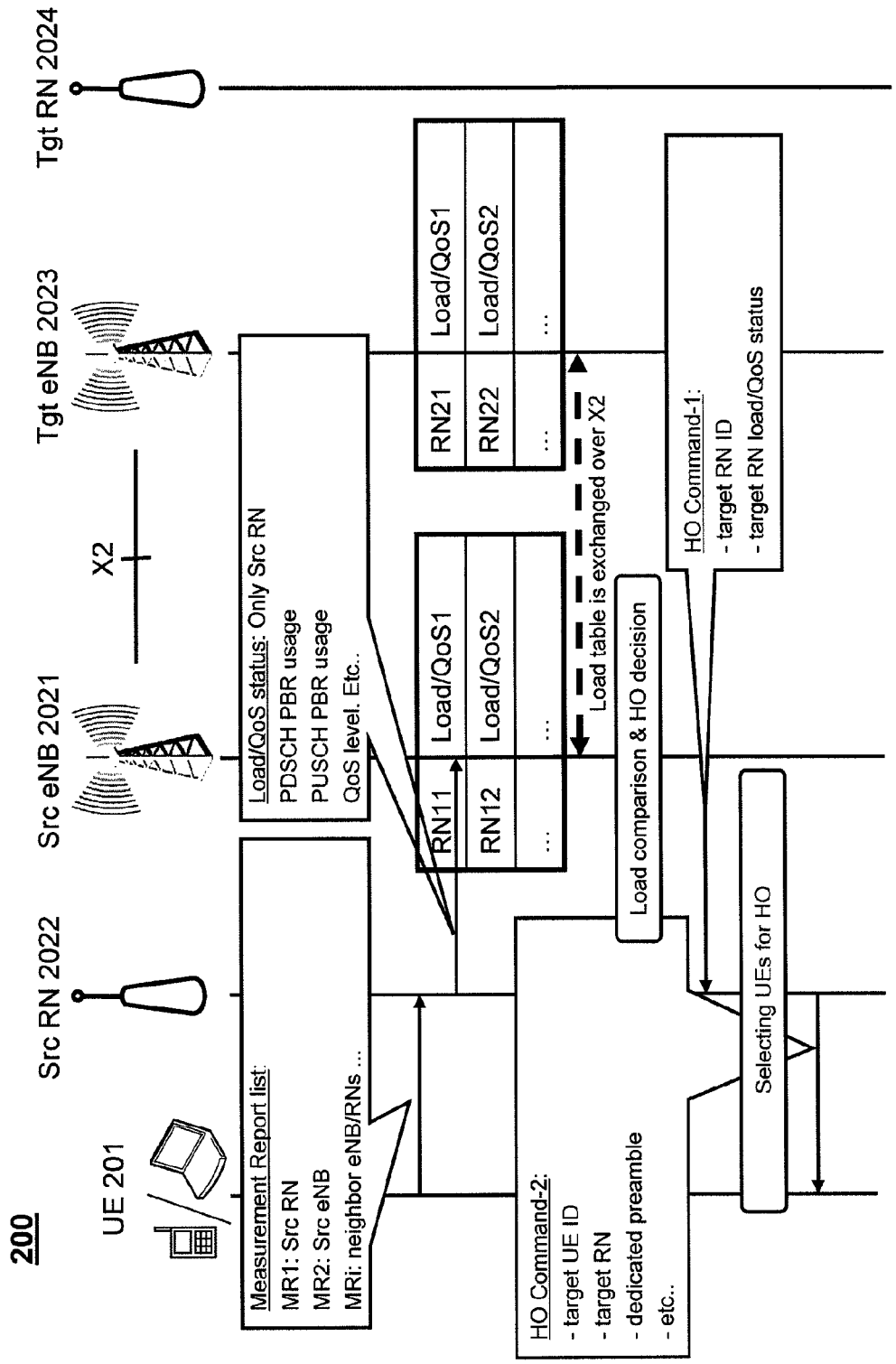

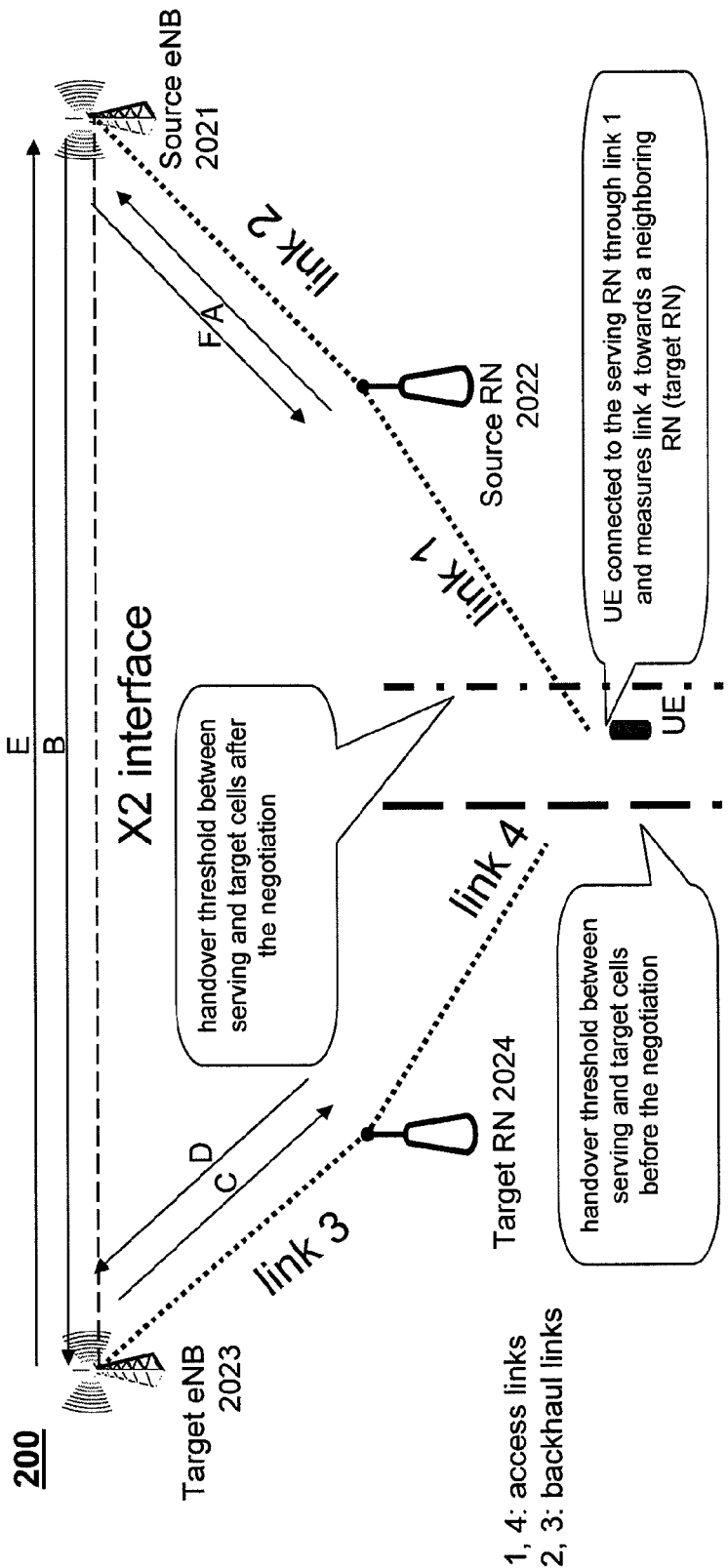

METHOD, APPARATUS, AND RELATED COMPUTER PROGRAM PRODUCT FOR LOAD BALANCING IN A RELAY NETWORK

FIELD OF THE INVENTION

Examples of the present invention relate to load balancing. More specifically, the examples of the present invention relate to a method, an apparatus, and a related computer program product for load balancing. The examples of the present invention may be applicable to load balancing for a user equipment (UE) utilized e.g. in long term evolution (LTE), e.g. by means of setting of handover thresholds depending e.g. on load conditions.

BACKGROUND

Relay stations (RSs) or Relay Nodes (RNs) have been proposed as coverage extensions in cellular systems. This recent development has triggered considerations of relays also in LTE. Thus, relaying has been proposed as a candidate feature for LTE-Advanced.

FIG. 1 illustrates a deployment scenario of a radio access network (RAN) with possible radio relayed extensions. Thus, FIG. 1 shows a communication system 100 that may comprise a user equipment (UE) 101 and a network (not shown). The communication system 100 may further comprise an evolved nodeB (eNB) 1021, which may provide access to the network, corresponding RNs #1 to #3 1022 connected to eNB 1021 via relay links (or equivalently backhaul links) and UEs 101 connected either to the RNs 1022 or directly to the eNB 1021 via access links.

As for the RNs 1022, apart from the main goal of coverage extension (shown at RN #2 1022), introducing relay concepts may also help in:

Provision of high-bit rate coverage in high shadowing environments (shown at RN #3 1022);
Reducing average radio-transmission power at the UE, thereby leading to long battery life;
Enhancing cell capacity and effective throughput, e.g., increasing cell-edge capacity and balancing cell load (shown at RN #1 1022); and
Enhancing overall performance and deployment cost of a radio access network (RAN).

There are many kinds of relay systems proposed, starting from the simplest one such as amplify/forward (e.g. applied in single frequency digital video broadcasting handheld (DVB-H) networks, for example) ending up to the most complex one, which may utilize a network coding to improve overall performance.

In self-organizing networks (SON), handover thresholds, based for example on load measurements, are used. The handover decision e.g. in active mode may be effected according to the following equations:

$$R_S = Q_{meas,s} + Qhyst_s \quad (1), \text{ and}$$

$$R_n = Q_{meas,n} - Qoffset_{s,n} \quad (2),$$

where $R_s$ and $R_n$ are the cell ranking for handover decision respectively in a serving/source cell s and in neighbor cells n; $Q_{meas,s}$ and $Q_{meas,n}$ are averaged signal measurements (e.g. reference signal received power (RSRP) or reference signal received quality (RSRQ)). However, the increase of the handover hysteresis $Qhyst_S$ or handover offset $Qoffset_{S,n}$ may cause the UE 101 to stay longer with the serving cell s.

Thus, the handover threshold setting may either delay or hasten the handover of a UE to a target cell. The handover procedure may remain the same as in the case of a network with no load balancing. That is, the load balancing may affect the handover process only indirectly by changing the values of the parameters, namely Rs and Rn, and the normal handover (i.e. handover in a network that does not consider load balancing) initiation, execution and finalization processes may remain valid.

In consideration of the above, according to examples of the present invention, a method, an apparatus and a related computer program product for load balancing are provided.

In this connection, the examples of the present invention enable one or more of the following:

Taking into account the load on the backhaul link by the handover decision, i.e. if a handover for the UE is to be effected towards the RN, taking into account that the UE will consume resources not only on the target RN-UE (e.g. access) link but also on the target eNB-RN (e.g. backhaul) link;
Coping with less information, i.e. the information on the load suffices, if the neighboring eNBs have information e.g. on the absolute number of resources. In that case, the number of residual resources may be derived (e.g. by multiplying total number of resources by (1-load)). Further, as for the coping with less information, e.g. the neighboring eNBs may not have information on the number of assigned resources e.g. for so-called backhauling, e.g. as a result of the resource partitioning.
Rendering the UE backward-compatible e.g. with legacy systems. In other words, from the UE's viewpoint, e.g. the serving network node (eNB or RN) could function in the same way as a legacy eNB;
Allowing users to benefit from relaying with legacy terminals. In other words, both legacy terminals and LTE-Advanced terminals can work equally well in legacy and LTE-Advanced networks.
Rendering LTE systems economically viable;
Keeping software and hardware updates between standard releases at the network side as small as possible;
Enabling the RN(s) to support main eNB functions. In other words, RN(s) is (are) capable of flexible resource sharing with a controlling eNB;
Enabling reduction of the serving/source cell load if overloaded;
Enabling adjustments of handover thresholds, thus controlling the handover offsets of the neighboring cells. Hence, both overloaded cells decreasing the offset and underemployed cells increasing the offset are taken into account. The offset may be negotiated between the two cells, i.e. the cell of interest may propose a new value (e.g. a step size can be defined) and the other cell may accept the value;
Having information that sufficient resources are available on the access link, while resources available on the backhaul link in the target cell may not be sufficient for supporting the UE;
Having information that sufficient resources are available also on "an almost congested" backhaul link in the target cell, and that the admission of the UE by the target RN (the admission may be decided by the target eNB) could decrease the average throughput that can be reached in the served area by the target RN;
Coping with resource partitioning not done properly, i.e. the target RN is congested not due to the access link but due to the backhaul link.

BRIEF DESCRIPTION OF THE DRAWINGS

The examples of the present invention are described herein below with reference to the accompanying drawings, in which:

FIG. 4 shows a method for load balancing according to a first to third examples of the present invention;

FIG. 4A shows a detail of the method for load balancing according to the first to third examples of the present invention;

FIG. 4C shows the method for load balancing according to the second example of the present invention;

FIG. 4D shows the method for load balancing according to the third example of the present invention;

FIG. 4E shows the method for load balancing according to the third example of the present invention in greater detail;

FIG. 4F shows a negotiation according to the method for load balancing according to the first to third examples of the present invention;

DETAILED DESCRIPTION OF THE EXAMPLES OF THE PRESENT INVENTION

The examples of the present invention are described herein below by way of example with reference to the accompanying drawings.

It is to be noted that for this description, the terms "backhaul links; access links; relay nodes; evolved nodes B; and link load, available link residual capacity and/or link quality" are examples for "links between the relaying source and target entities and the source and target network access entities; links between the relaying source and target entities and the terminal; relaying source and target entities; the source and target network access entities; and link information", respectively, without restricting the latter-named terms to the special technical or implementation details imposed to the first-named terms. Further, the examples of the present invention are presented in an exemplary case of a handover e.g. from a source RN to a target RN, since any other possible handover (e.g. from source RN to target eNB, from source eNB to target RN or from source eNB to target eNB) may be considered as a simplification of the examples of the present invention.

Figure 1:
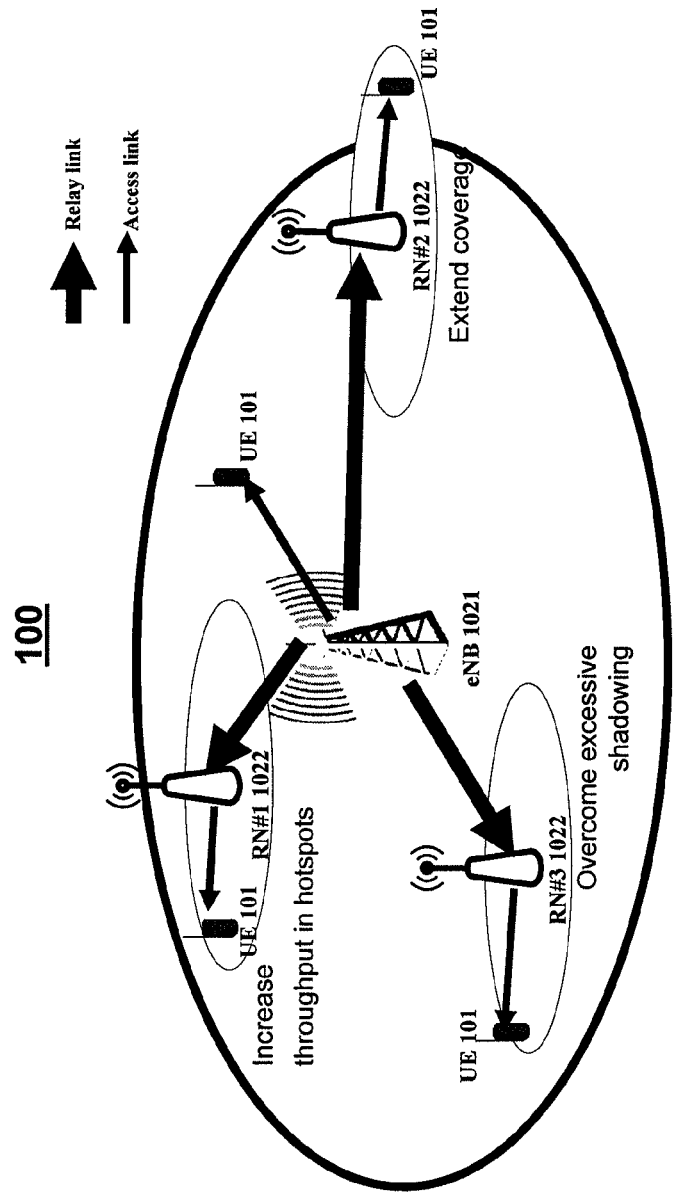
FIG. 1 shows radio access network deployment with fixed RNs.
Figure 2:
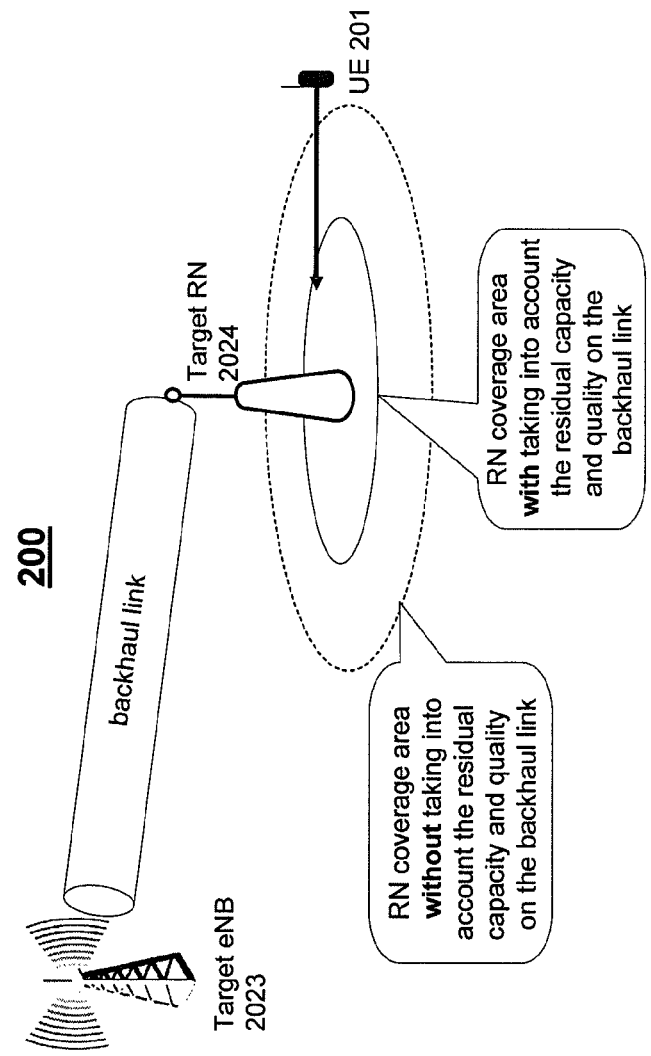
FIG. 2 shows a first principle underlying the examples of the present invention.

FIG. 2 shows the first principle underlying the examples of the present invention. As shown in FIG. 2, a communication network 200 may comprise a UE 201, a serving or source eNB (not shown), a serving or source RN (not shown), a target eNB 2023, a target RN 2024 and a network (not shown) to which the eNB 2023 may provide access to.

For example, the serving eNB may be defined as the station that controls the serving RN. If the UE 201 is connected to the serving RN, the end to end throughput (TP) may be expressed as:

$$TP_{eNB-RN-UE} = \min\{TP_{eNB-RN}, TP_{RN-UE}\},$$

where $TP_{eNB-RN}$ and $TP_{RN-UE}$ are throughputs on respectively the serving eNB-RN link (also referred to as backhaul link) and serving RN-UE link (also referred to as access link). When the UE 201 is connected e.g. to the target RN 2024, the same equation may express the end to end throughput, where $TP_{eNB-RN}$ and $TP_{RN-UE}$ may be throughputs on respectively the target eNB-RN link and target RN-UE link.

Depending on which of the backhaul and access links may be considered as a bottleneck, if the UE 201 is handed over to the target RN 2024, the handover decision may take into account not only the resources required on the access link, but also on the backhaul link in the target cell. FIG. 2 shows that a coverage area of the target RN 2024 may be reduced, if resources on the backhaul link are not properly assigned (e.g. there may not be enough available resources to accept the new UE 201), e.g. if the resource partitioning does not work properly or cannot be done optimally due to given constraints.

Figure 3:
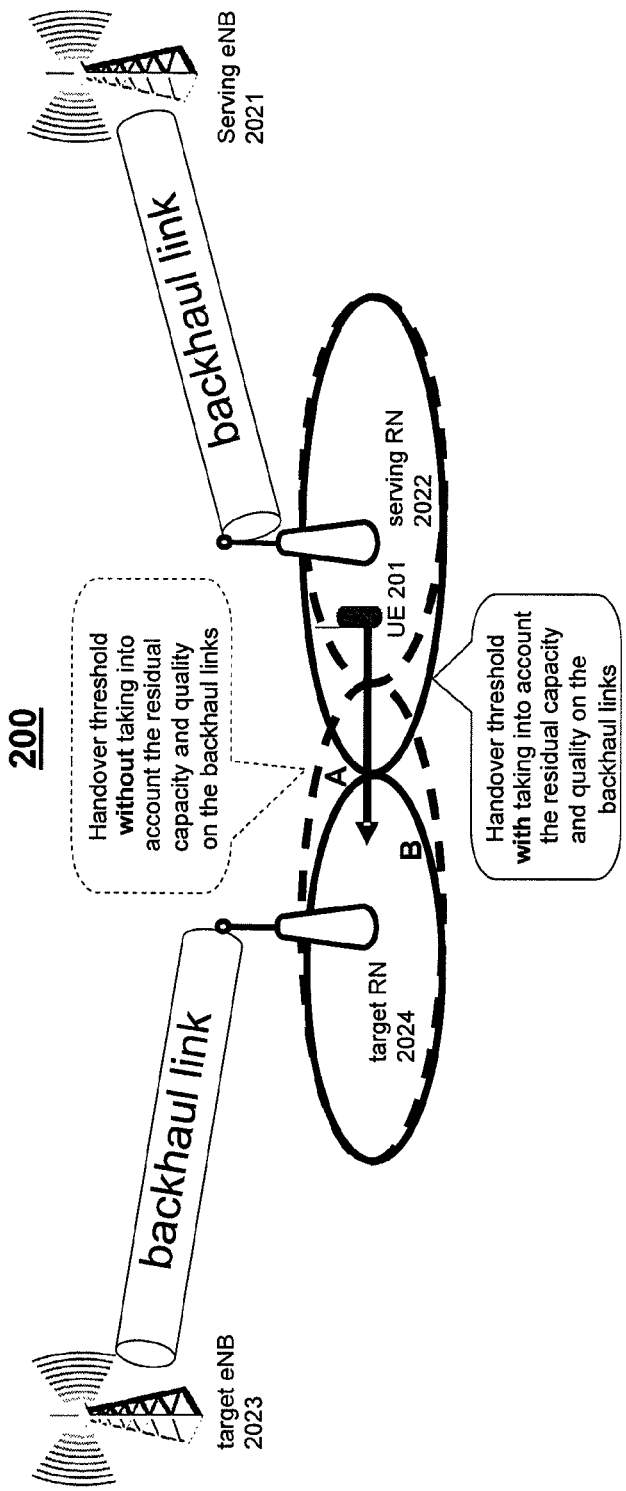
FIG. 3 shows a second principle underlying the examples of the present invention.

FIG. 3 shows the second principle underlying the examples of the present invention. As shown in FIG. 3, the communication network 200 may comprise the UE 201, the serving or source eNB 2021, the serving or source RN 2022, the target eNB 2023, the target RN 2024 and the network (not shown) to which the eNBs 2021 and/or 2023 may provide access to.

As shown in FIG. 3, thresholds used for a handover decision may consider e.g. the congestion on the backhaul link. Accordingly, if A denotes the coverage area of the target RN without taking into account the backhaul link, the congestion of backhaul link leads to a smaller coverage area denoted by B. Further, the congestion on the backhaul link is taken into account, performing the associated measurements and signaling.

That is, an effective cell load $\rho_{eff,s}$ in the serving or source cell s may be maximal between cell load $\rho_s$ and the load of the backhaul link $\rho_{backhaul,s}$: $\rho_{eff,s} = \max\{\rho_s, \rho_{backhaul,s}\}$. The same can be measured for the target cell. Also, other equations that combine the load on the backhaul link and the load on the access link providing the load on the multi-hop link (eNB-RN-UE) can be assumed.

That is, the following exemplary information may be forwarded from the RN 2022, 2024 to the eNB 2021, 2023:

e.g. measurements on radio resources assigned for the backhaul link for downlink traffic and/or uplink traffic.

Consequently, the following exemplary information may be forwarded from the eNB 2021 to the neighboring eNB(s) 2023:

loads on backhaul links computed at the eNB on the basis of measurements received from RNs for downlink traffic and measured directly by the eNB for uplink traffic.

An alternative solution may reside in computing e.g. the load in downlink on the backhaul link at the RN 2022 and forwarding the computed load to the eNB 2021. The eNB 2021 may then forward the received downlink loads from RNs 2022, 2024 and the computed uplink loads e.g. to the neighboring eNB(s) 2023.

Based on the measurements received at the serving eNB 2021 from the served RN(s) 2022 and neighboring eNB(s) 2023, the serving eNB 2021 can negotiate the handover thresholds. (Each) eNB 2021 may forward the estimated loads on the backhaul link(s) to the neighboring eNB(s) 2023 in order to allow computing of the load in the neighboring cells also taking into account backhaul links possibly congested.

FIGS. 4 and 4A to 4F show the method for load balancing according to the first to third examples of the present invention. Signaling between elements is indicated in horizontal direction, while time aspects between signaling may be reflected in the vertical arrangement of the signaling sequence as well as in the sequence numbers. It is to be noted that the time aspects indicated in FIGS. 4 and 4E do not necessarily restrict any one of the method steps shown to the step sequence outlined. This applies in particular to method steps that are functionally disjunctive with each other. Within FIGS. 4 and 4E, for ease of description, means or portions which may provide main functionalities are depicted with solid functional blocks or arrows and/or a normal font, while means or portions which may provide optional functions are depicted with dashed functional blocks or arrows and/or an italic font.

As shown in FIGS. 4 and 4A to 4F, the communication system 200 may comprise the UE 201 and the network (not shown). In turn, the communication system 200 may further comprise the source or serving eNB 2021, the source or serving RN 2022, the target eNB 2023 and the target RN 2024. The source eNB 2021 and/or the target eNB 2023 may provide access to the network.

As shown in FIGS. 4 and 4A, in an optional step S1, e.g. the target eNB 2023 may perform receiving, e.g. from the target RN 2024 and/or e.g. prior to a transmitting to be described herein below, at least a portion of information (referred to as second information herein below) related to a link (e.g. link 4) that may be established between the terminal (e.g. UE 201) and the relaying target entity, which may be the result of the handover of UE 201 to the target RN 2024. The information may be a residual capacity of access link 4, e.g. expressed as the total capacity available at the target RN 2024 minus capacity consumed by UEs connected to the target RN 2024.

The residual capacity may be a measure associated with the target RN 2024 (e.g. total capacity available at the target RN 2024 minus residual capacity consumed by the UE 201 connected to the target RN 2024). This residual capacity could be used to serve UE 201 upon handover.

Further, e.g. the target eNB 2023 may perform holding information (e.g. capacity 3 and/or quality 3) related to a link (e.g. link 3) between the relaying target entity and the target network access entity. This information may be already available at target eNB 2023 because it may be used for the resource partitioning; it may also be sent from the target RN 2024 to the target eNB 2023.

Further, in an optional step S2, e.g. the target eNB 2023 may relaying (or forwarding) (e.g. via an X2 interface) the portion of the second information e.g. to the source network access entity (e.g. source eNB 2021) As shown in FIG. 4A, along with the second information, also information (e.g. capacity 3 and/or quality 3) held by the target network access entity related to the link (e.g. link 3) between the relaying target entity and the target network access entity may be transmitted. It is to be noted that the optional relaying step S2 may be omitted e.g. if the source and target eNBs 2021, 2023 are constituted by the same eNB. Capacity 3 may be the residual capacity on backhaul link, while quality 3 may be the modulation and coding or the signal to noise interference ratio (SINR) on backhaul link.

Figure 4B:
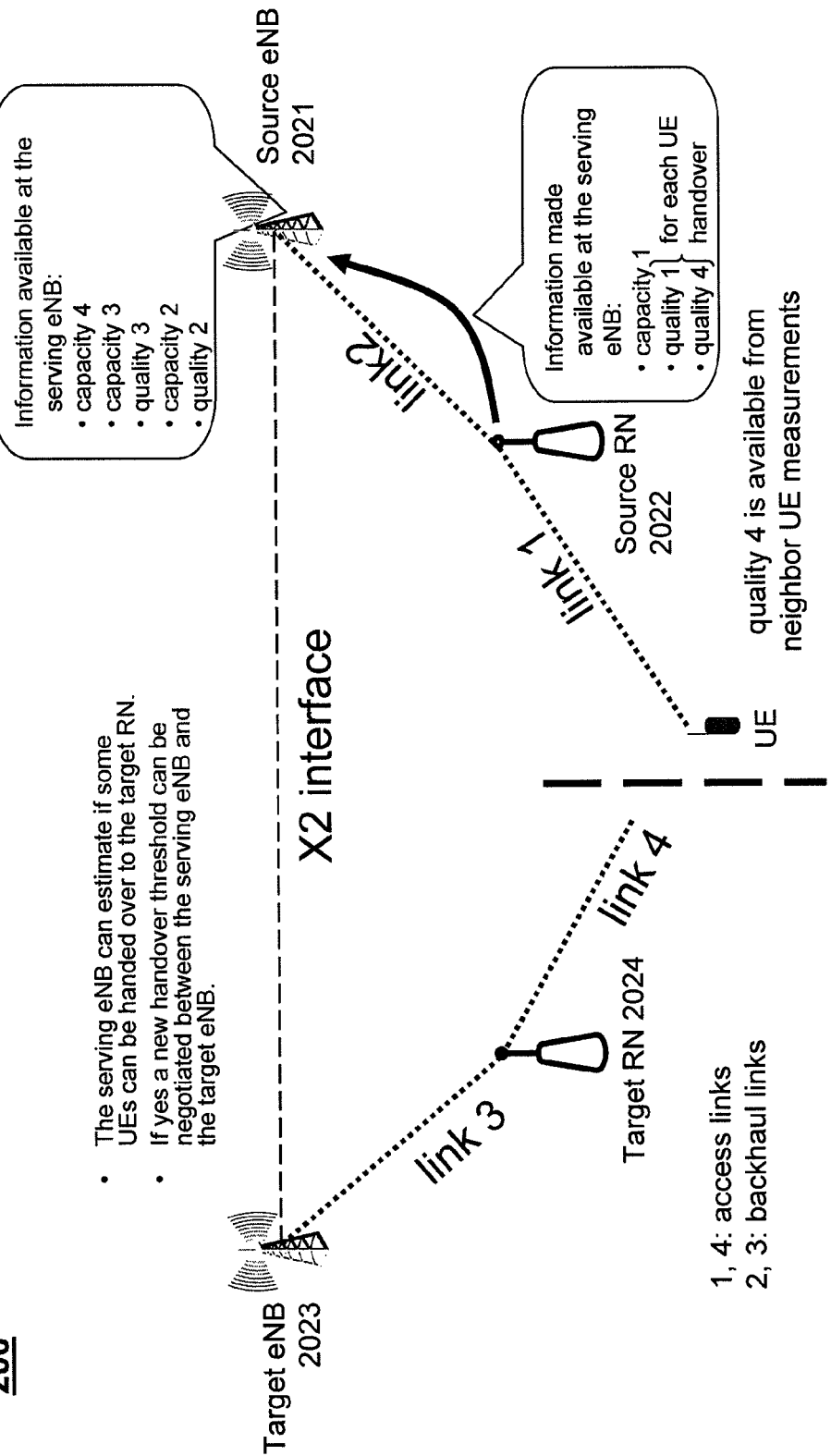
FIG. 4B shows the method for load balancing according to the first example of the present invention.

As shown in FIGS. 4 and 4B, according to the first example of the present invention (related to a so-called "centralized approach"), in an optional step S3a, e.g. the relaying source entity may perform transmitting, e.g. from the relaying source entity to the source network access entity and/or e.g. prior to a deciding to be described herein below, information (which may comprise the above described second information, e.g. capacity 1, quality 1, quality 4) related to a link (e.g. link 1) between the terminal and the relaying source entity and the link (e.g. link 4) between the terminal and the relaying target entity. The capacity 1 may comprise the residual capacity at relaying source entity plus the capacity used by UE 201. Quality 1 may be the modulation and coding or SINR on the link between source RN and UE 201. Quality 4 may be the SINR measured between target RN and UE 201. As for quality 4, the UE 201 can obtain SINR measurements.

Further, in an optional step S3b, the transmitted information may be received e.g. by the source network access entity 2021. In this case, as shown in FIG. 4B, e.g. the source network access entity (e.g. source eNB 2021) may hold information (e.g. capacities 1 to 4 and qualities 1 to 4) related to links 1 to 4, e.g. both backhaul links between the eNBs 2021, 2023 and the RNs 2022, 2024 and both access links between the UE 201 and the RNs 2022, 2024. Capacity 2 may be the residual capacity on link 2 plus the capacity used to send throughput from source eNB to source RN designated for UE 201. Quality 2 may be the modulation and coding or the SINR on link 2.

It is to be noted that in the following, the examples of the present invention relate to capacity 1 to and quality 1 to 4 as presented in the above description.

Alternatively, as shown in FIGS. 4 and 4C, according to the second example of the present invention (related to a so-called "decentralized approach"), in the optional step S3a, e.g. the source network access entity (e.g. source eNB 2021) may perform transmitting, e.g. from the source network access entity to the relaying source entity and/or e.g. prior to the deciding to be described herein below, information (which may comprise the above described second information, e.g. capacities 2, 3 and 4 and quality 3) related to a link (e.g. link 4) between a terminal (e.g. UE 201) and the relaying target entity, a link (e.g. link 3) between the relaying target entity and the target network access entity, and a link (e.g. link 2) between the relaying source entity and the source network access entity. Further, in the optional step S3b, the transmitted information may be received e.g. by the relaying source entity 2022. In this case, as shown in FIG. 4C, e.g. the relaying source entity (e.g. source RN 2022) may hold information (e.g. capacities 1 to 4 and qualities 1 to 4) related to links 1 to 4, e.g. both backhaul links between the eNBs 2021, 2023 and the RNs 2022, 2024 and both access links between the UE 201 and the RNs 2022, 2024.

Alternatively, as shown in FIGS. 4, 4D and 4E, according to the third example of the present invention (related to a so-called "mixed approach"), in the optional step S3a, e.g. the relaying source entity may perform transmitting, e.g. from the relaying source entity to the source network access entity and/or e.g. prior to a deciding to be described herein below, information (e.g. capacity 1) related to a link between the terminal and the relaying source entity. Further, in the optional step S3b, the transmitted information may be received e.g. by the source network access entity 2021. In this case, as shown in FIG. 4D, e.g. the source network access entity (e.g. source eNB 2021) may hold information (e.g. capacities 1 to 4 and qualities 2 and 3) related to links 1 to 4, e.g. both backhaul links between the eNBs 2021, 2023 and the RNs 2022, 2024 and both access links between the UE 201 and the RNs 2022, 2024, while the relaying source entity (e.g. source RN 2022) may hold information (e.g. capacity 1 and qualities 1, 2 and 4) related to links 1, 2 and 4, e.g. the backhaul link between the source eNB 2021 and the source RN 2022 and both access links between the UE 201 and the RNs 2022, 2024.

Then, in step S4, e.g. the serving or source network access entity 2021 (in the above first example, e.g. "centralized" approach) or the serving or relaying source entity 2022 (in the above second and third examples, e.g. "decentralized" and "mixed" approaches), may perform deciding a handover of the terminal (e.g. UE 201) from the relaying source entity to the relaying target entity based on information related to at least one link (e.g. backhaul links 2 and/or 3) between the relaying source and target entities (e.g. serving/target RNs 2022, 2024) and the source and target network access entities (e.g. serving/target eNBs 2021, 2023).

Then, in an optional step S5 relating to the first to third examples of the present invention, e.g. the source and target eNBs 2021, 2023 and source and target RNs 2022, 2024 may perform negotiating, after the deciding, a handover threshold for the terminal (e.g. UE 201) based on the information related to at least one link (e.g. backhaul link 2 and/or 3) between the relaying source and target entities (e.g. RNs 2022, 2024) and the source and target network access entities (e.g. eNBs 2021, 2023).

Further, as shown in FIG. 4E, the negotiation related to the third example of the present invention, may comprise transmitting a first handover command e.g. from the source eNB 2021 to the source RN 2022, selecting at least one UE 201 for handover, and transmitting a second handover command e.g. from the source RN 2021 to the at least one selected UE 201.

Further, as shown in FIG. 4F, the negotiation related to the first to third examples of the present invention may further comprise messaging involving messages A to F, depending on which of the first to third examples is employed. Messages A to F may be employed in the second example ("decentralized" approach); a possible overhead for messages A, C, D and F may be avoided in the first example ("centralized" approach) assuming both the initiation of handover threshold negotiation and initiation of handover command happen at source eNB; a possible overhead for messages A and D may be avoided in the first example ("centralized" approach) assuming the initiation of handover threshold negotiation occurs at source eNB but the initiation of handover command is performed by source RN; and a possible overhead for messages A, C, D and F may be avoided in the third example ("mixed" approach) because both the initiation of handover threshold negotiation and initiation of handover command are done at source eNB.

As for developments of the first to third examples of the present invention, the links between the relaying source and target entities and the source and target access entities may be constituted by backhaul links, and/or the links between the relaying source and target entities and the terminal may be constituted by access links. Further, the relaying source and target entities may be constituted by relay nodes, and/or the source and target network access entities may be constituted by evolved nodes B. Moreover, the information and/or the second information may relate to link congestion. More specifically, the information and/or the second information may comprise residual capacity information and/or quality information. In that case, the quality information may be constituted by a modulation and coding scheme or an average signal interference to noise ratio. Further, the residual capacity information may comprise a link load and/or an available residual link capacity. In the first case, the link load imposed by downlink traffic may be computed based measurements received from the relay nodes. Alternatively, the link load imposed by uplink traffic may be computed based on measurements by the evolved nodes B. In the latter case, the available residual link capacity may be indicated by physical resource blocks.

Figure 5A:
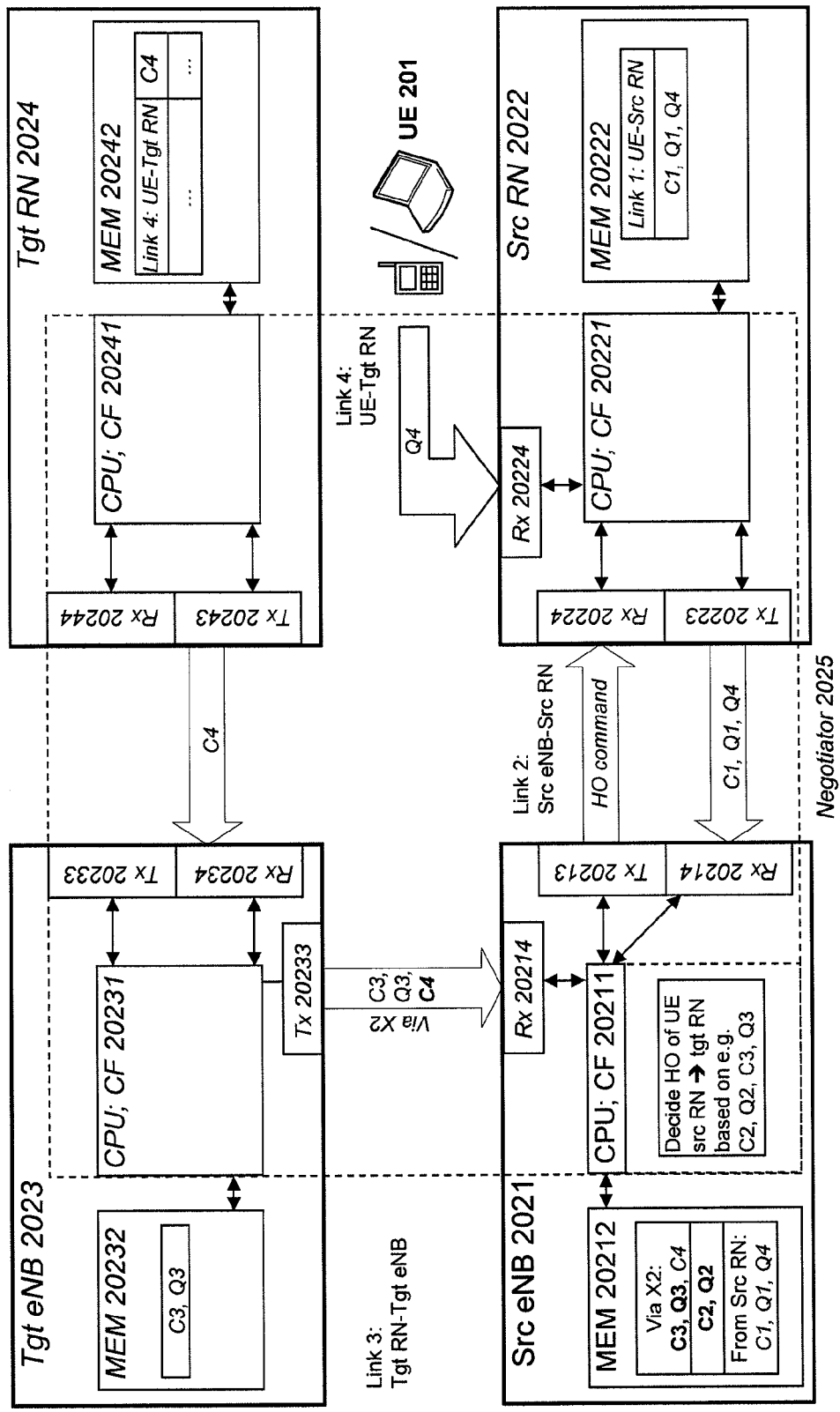
FIG. 5A shows an apparatus for load balancing according to the first example of the present invention.
Figure 5B:
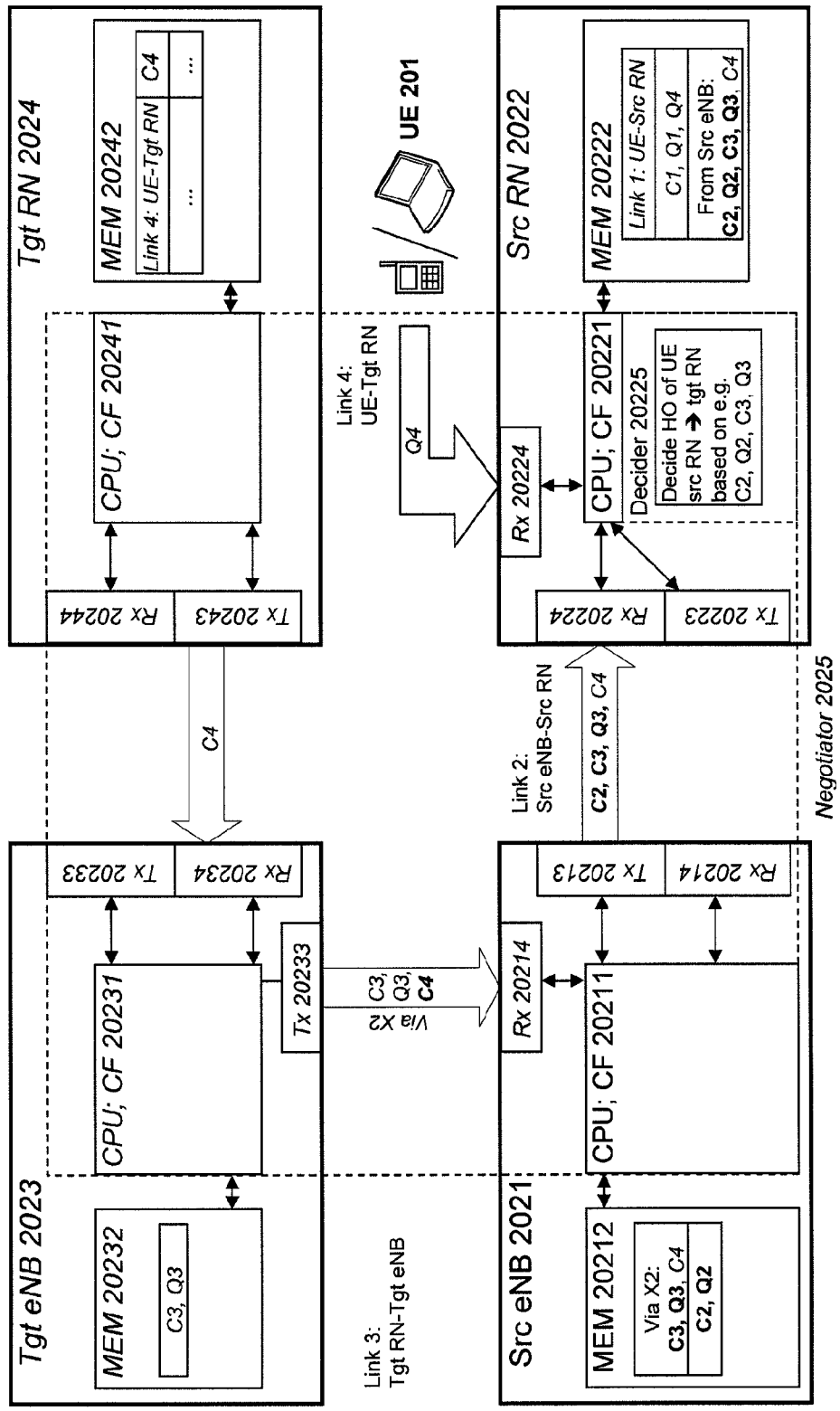
FIG. 5B shows an apparatus for load balancing according to the second example of the present invention.
Figure 5C:
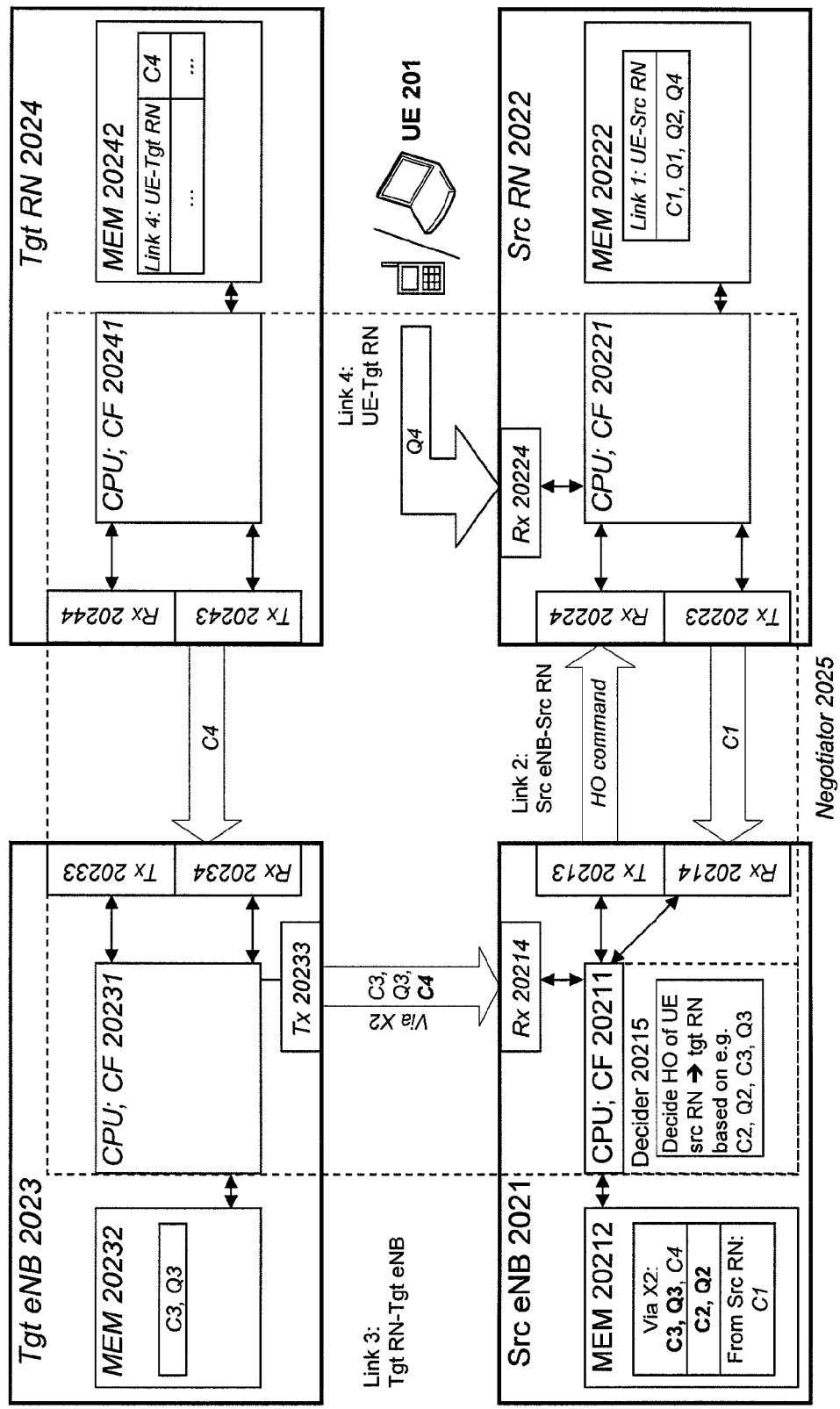
FIG. 5C shows an apparatus for load balancing according to the third example of the present invention.

FIGS. 5A to 5C show an apparatus (e.g. source eNB 2021 or source RN 2022) for load balancing according to the first to third examples of the present invention. Within FIGS. 5A to 5C, for ease of description, means or portions which may provide main functionalities are depicted with solid functional blocks or arrows and/or a normal font, while means or portions which may provide optional functions are depicted with dashed functional blocks or arrows and/or an italic font.

The source eNB 2021 may comprise a CPU (or core functionality CF) 20211, a memory 20212, an optional transmitter (or means for transmitting) 20213, an optional receiver (or means for receiving) 20214 and a decider (or means for deciding) 20215 (e.g. in the first and third examples as shown in FIGS. 5A and 5C).

The source RN 2022 may comprise a CPU (or core functionality CF) 20221, a memory 20222, an optional transmitter (or means for transmitting) 20223, an optional receiver (or means for receiving) 20224 and a decider (or means for deciding) 20225 (e.g. in the second example shown in FIG. 5B).

Further, the target eNB 2023 may comprise a CPU (or core functionality CF) 20231, a memory 20232, an optional transmitter (or means for transmitting) 20233 and an optional receiver (or means for receiving) 20234.

Finally, the target RN 2024 may comprise a CPU (or core functionality CF) 20241, a memory 20242, an optional transmitter (or means for transmitting) 20243 and an optional receiver (or means for receiving) 20244.

As indicated by the dashed extensions of the functional blocks of the CPU 20211 or 20221, the means for deciding 20215, 20225 of the source eNB 2021 or source RN 2022 may be functionalities running on the CPU 20211 or 20221 of the source eNB 2021 or source RN 2022, or may alternatively be separate functional entities or means.

The CPUs 20$x$1 (wherein x=21, 22, 23 and 24) may respectively be configured, for example by software residing in the memory 20$x$2, to process various data inputs and to control the functions of the memories 20$x$2, the means for transmitting 202$x$3 and the means for receiving 20$x$4 (and the means for deciding 20215 or 20225 of the source eNB 2021 or source RN 2022). Further, it is to be noted that the CPUs 20$x$1, the means for transmitting 20$x$3 and the means for receiving 20$x$4 may constitute means for negotiating 2025 in the sense of the first to third examples of the present invention. The memories 20$x$2 may serve e.g. for storing code means for carrying out e.g. the methods according to the example of the present invention, when run e.g. on the CPUs 20$x$1. It is to be noted that the means for transmitting 20$x$3 and the means for receiving 20$x$4 may alternatively be provided as respective integral transceivers. It is further to be noted that the transmitters/receivers may be implemented i) as physical transmitters/receivers for transceiving e.g. via the air interface (e.g. between the UE 201 and the eNB 202-1), ii) as routing entities e.g. for transmitting/receiving data packets e.g. in a PS (packet switching) network (e.g. between the source eNB 2021 and the target eNB 2023 when disposed as separate network entities), iii) as functionalities for writing/reading information into/from a given memory area (e.g. in case of shared/common CPUs or memories e.g. of the source eNB 2021 and the target eNB 2023 when disposed as an integral network entity), or iv) as any suitable combination of i) to iii).

Optionally, as shown in FIGS. 5A to 5C, e.g. the means for receiving 20234 of the target eNB 2023 may perform receiving, e.g. from the target RN 2024 and/or e.g. prior to a transmitting to be described herein below, at least a portion of information (referred to as second information herein below) related to a link (e.g. link 4) that may be established between the terminal (e.g. UE 201) and the relaying target entity, which may be the result of the handover of UE 201 to the target RN 2024. The information may be a residual capacity of access link 4, e.g. expressed as the total capacity available at the target RN 2024 minus capacity consumed by UEs connected to the target RN 2024.

The residual capacity may be a measure associated with the target RN 2024 (e.g. total capacity available at the target RN 2024 minus residual capacity consumed by the UE 201 connected to the target RN 2024). This residual capacity could be used to serve UE 201 upon handover.

Further optionally, e.g. the memory 20232 of the target eNB 2023 may perform holding information (e.g. capacity 3 and/or quality 3) related to a link (e.g. link 3) between the relaying target entity and the target network access entity. This information may be already available at target eNB 2023 because it may be used for the resource partitioning; it may also be sent from the target RN 2024 to the target eNB 2023

Further optionally, e.g. the means for transmitting 20233 of the target eNB 2023 may perform relaying (or forwarding) (e.g. via an X2 interface) the portion of the second information e.g. to the source network access entity. As shown in FIG. 5A, along with the second information, also information (e.g. capacity 3 and/or quality 3) held by the target network access entity related to the link (e.g. link 3) between the relaying target entity and the target network access entity may be transmitted. It is to be noted that the optional relaying performed by the means for transmitting 20233 may be omitted e.g. if the source and target eNBs 2021, 2023 are constituted by the same eNB. The capacity 1 may comprise the residual capacity at relaying source entity plus the capacity used by UE 201. Quality 1 may be the modulation and coding or SINR on the link between source RN and UE 201. Quality 4 may be the SINR measured between target RN and UE 201.

As shown in FIG. 5A, according to the first example of the present invention (related to a so-called "centralized approach"), optionally, e.g. the means for transmitting 20223 of the relaying source entity may perform transmitting, e.g. from the relaying source entity to the source network access entity and/or e.g. prior to a deciding performed by the means for deciding to be described herein below, information (which may comprise the above described second information, e.g. capacity 1, quality 1, quality 4) related to a link (e.g. link 1) between the terminal and the relaying source entity and the link (e.g. link 4) between the terminal and the relaying target entity. The capacity 1 may comprise the residual capacity at relaying source entity plus the capacity used by UE 201. Quality 1 may be the modulation and coding or SINR on the link between source RN and UE 201. Quality 4 may be the SINR measured between target RN and UE 201. As for quality 4, the UE 201 can obtain SINR measurements.

Further optionally, the information transmitted by the means for transmitting 20223 may be received e.g. by the means for receiving 20214 of the source network access entity 2021. In this case, as shown in FIG. 5A, e.g. the memory 20211 of the source network access entity (source eNB 2021) may hold information (e.g. capacities 1 to 4 and qualities 1 to 4) related to links 1 to 4, e.g. both backhaul links between the eNBs 2021, 2023 and the RNs 2022, 2024 and both access links between the UE 201 and the RNs 2022, 2024. Capacity 2 may be the residual capacity on link 2 plus the capacity used to send throughput from source eNB to source RN designated for UE 201. Quality 2 may be the modulation and coding or the SINR on link 2.

It is to be noted that in the following, the examples of the present invention relate to capacity 1 to and quality 1 to 4 as presented in the above description.

Alternatively, as shown in FIG. 5B, according to the second example of the present invention (related to a so-called "decentralized approach"), optionally, e.g. the means for transmitting 20213 of the source network access entity (source eNB 2021) may perform transmitting, e.g. from the source network access entity to the relaying source entity and/or e.g. prior to the deciding performed by the means for deciding 20225 to be described herein below, information (which may comprise the above described second information, e.g. capacities 2, 3 and 4 and quality 3) related to a link (e.g. link 4) between a terminal (e.g. UE 201) and the relaying target entity, a link (e.g. link 3) between the relaying target entity and the target network access entity, and a link (e.g. link 2) between the relaying source entity and the source network access entity. Further optionally, the information transmitted by the means for transmitting 20213 may be received e.g. by the means for receiving 20224 of the relaying source entity 2022. In this case, as shown in FIG. 5B, e.g. the memory 20222 of the relaying source entity (e.g. source RN 2022) may hold information (e.g. capacities 1 to 4 and qualities 1 to 4) related to links 1 to 4, e.g. both backhaul links between the eNBs 2021, 2023 and the RNs 2022, 2024 and both access links between the UE 201 and the RNs 2022, 2024.

Alternatively, as shown in FIG. 5C, according to the third example of the present invention (related to a so-called "mixed approach"), optionally, e.g. the means for transmitting 20223 of the relaying source entity may perform transmitting, e.g. from the relaying source entity to the source network access entity and/or e.g. prior to a deciding to be described herein below, information (e.g. capacity 1) related to a link between the terminal and the relaying source entity. Further optionally, information transmitted by the means for transmitting 20223 may be received e.g. by the means for receiving 20214 of the source network access entity 2021. In this case, as shown in FIG. 5C, e.g. the memory 20212 of the source network access entity (source eNB 2021) may hold information (e.g. capacities 1 to 4 and qualities 2 and 3) related to links 1 to 4, e.g. both backhaul links between the eNBs 2021, 2023 and the RNs 2022, 2024 and both access links between the UE 201 and the RNs 2022, 2024, while the memory 20222 of the relaying source entity (e.g. source RN 2022) may hold information (e.g. capacity 1 and qualities 1, 2 and 4) related to links 1, 2 and 4, e.g. the backhaul link between the source eNB 2021 and the source RN 2022 and both access links between the UE 201 and the RNs 2022, 2024.

Then, e.g. the means for deciding 20215, 20225 of the serving or source network access entity 2021 (in the above first and third examples, e.g. "centralized" approach) or the serving or relaying source entity 2022 (in the above second example, e.g. "decentralized" and "mixed" approaches), may perform deciding a handover of the terminal (e.g. UE 201) from the relaying source entity (e.g. serving RN 2022) to the relaying target entity (e.g. target RN 2024) based on information related to at least one link (e.g. backhaul links 2 and/or 3) between the relaying source and target entities (e.g. serving/target RNs 2022, 2024) and the source and target network access entities (e.g. serving/target eNBs 2021, 2023).

Optionally, relating to the first to third examples of the present invention, e.g. the CPUs 20211, 20221, 20231, 20241, the means for transmitting 20213, 20223, 20233, 20243 and the means for receiving 20214, 20224, 20234, 20244 of the source and target eNBs 2021, 2023 and source and target RNs 2022, 2024 may act as the means for negotiating 2025 in order to perform negotiating, after the deciding performed by the means for deciding 20215, 20225, a handover threshold for the terminal (e.g. UE 201) based on the information related to the at least one link (e.g. backhaul link 2 and/or 3) between the relaying source and target entities (e.g. RNs 2022, 2024) and the source and target network access entities (e.g. eNBs 2021, 2023).

Further, the means for negotiating 2025 relating to the third example of the present invention, may be configured to transmit a first handover command e.g. from the source eNB 2021 to the source RN 2022, to select at least one UE 201 for handover, and to transmit a second handover command e.g. from the source RN 2021 to the at least one selected UE 201.

Further, the means for negotiating 2025 related to the first to third examples of the present invention may further perform messaging involving messages A to F, depending on which of the first to third examples is employed. Messages A to F may be employed in the second example ("decentralized" approach); a possible overhead for messages A, C, D and F may be avoided in the first example ("centralized" approach) assuming both the initiation of handover threshold negotiation and initiation of handover command happen at source eNB; a possible overhead for messages A and D may be avoided in the first example ("centralized" approach) assuming the initiation of handover threshold negotiation occurs at source eNB but the initiation of handover command is performed by source RN; and a possible overhead for messages A, C, D and F may be avoided in the third example ("mixed" approach) because both the initiation of handover threshold negotiation and initiation of handover command are done at source eNB.

As for developments of the first to third examples of the present invention, the links between the relaying source and target entities and the source and target access entities may be constituted by backhaul links, and/or the links between the relaying source and target entities and the terminal may be constituted by access links. Further, the relaying source and target entities may be constituted by relay nodes, and/or the source and target network access entities may be constituted by evolved nodes B. Moreover, the information and/or the second information may relate to link congestion. More specifically, the information and/or the second information may comprise capacity information and/or quality information. In that case, the quality information may be constituted by a modulation and coding scheme or an average signal interference to noise ratio. Further, the capacity information may comprise a link load and/or an available residual link capacity. In the first case, the link load imposed by downlink traffic may be computed based measurements received from the relay nodes. Alternatively, the link load imposed by uplink traffic may be computed based on measurements by the evolved nodes B. In the latter case, the available residual link capacity may be indicated by physical resource blocks.

Furthermore, at least one of, or more of the above-described means for transmitting 20243, means for relaying 20233, means for transmitting 20213, 20223, the means for deciding 20215, 20225, the means for negotiating 2025 as well as the source eNB 2021 or source RN 2022, or the respective functionalities carried out, may be implemented as a chipset, module or subassembly.

Finally, the present invention also relates to a system which may comprise the source eNB 2021 or the source RN 2022 according to the above-described first to third examples of the present invention as well the above-described target eNB 2023 and target RN 2024.

Without being restricted to the details following in this section, the examples of the present invention may be summarized as follows:

There is proposed, for cellular relaying, a detect/forward type of relay, where an input signal is detected and retransmitted using the same procedure as in the original transmission.

Relaying can be realized at the different layers of the protocol stack. A simple amplify and forward relaying can be realized at the L1 of the protocol stack where the relay is required to have only (some part of) the PHY layer. L2 RNs, which include the protocol stack up to the MAC/RLC layers, enable the possibility of doing decentralized radio resource management. L3 or higher layer RNs could almost be considered as wireless base stations and support all the protocol layers of normal base stations.

Moreover, the following not being a limiting choice, it can be assumed that at maximum, 2 hops may be allowed in the system (e.g. links eNB-UE or eNB-RN-UE), Tree topology is present (e.g. no connections between relays), Only UE handover from the serving RN (connected to the serving eNB) to the target RN (connected to the target eNB) is considered because any other case is a simplification of this case, Focus is on the downlink In high loaded scenarios, the overhead on the backhaul link in case of decentralized approach may be fixed, while the overhead on the backhaul link in case of centralized approach may depend on the number of UEs to be handed over, A combined measurement of the status in the serving cell (backhaul+access) can be sent on X2 interface; this may reduce the overhead on the backhaul link in downlink in case of decentralized approach, and The described message exchange can be reduced combining some of the measurement reports and sending only the combination.

These assumptions may be used to simplify the system settings, but it is emphasized that examples of the present invention may be extended to cover also other network topologies.

As described hereinabove, with the "centralized" approach, the serving eNB may decide to negotiate handover thresholds. The handover initiation may be "centralized" (decided at serving eNB) or "decentralized" (decided at the serving RN). Both cases refer to the "centralized" approach for handover thresholds negotiation, i.e. if we have the centralized handover thresholds optimization (decided at eNB), the handover can be centralized (decided at eNB) or distributed (decided at RN).

A SON entity may be involved in the handover threshold negotiation. The approach is similar to the "centralized" approach. In this case information on capacity 3, 4 and quality 3 are sent also by the target eNB to the SON entity, while capacity 1, 2 and quality 1, 2 and 4 are sent from source eNB to the SON entity. The SON entity is responsible to compute the new handover thresholds and communicate them to the source eNB and target eNB.

With the "decentralized" approach, the serving RN may decide to negotiate handover thresholds.

The mechanism to update the thresholds used for taking the handover decision in the serving eNB described in the examples according to the present invention may be completely transparent to the UEs, and as such release 8 UEs may benefit from it.

The use of thresholds that already take into account congestion on the backhaul links (by means of residual capacity and quality measures) may reduce the number of so-called ping pong, where an UE handed over to a RN it is handed over back to the previous RN. A common relay scenario may consist of several RNs placed at the eNB cell coverage edge, therefore handover among RNs may be expected to occur quite often. Moreover, the system throughput may be optimized because an UE is not handed over to another RN (but it remains connected to the current RN) if it may be expected to be served (if connected to the other RN) with a lower throughput due to high load on the access link and/or on the backhaul link.

If the resource partitioning does not properly/optimally assign resource on the backhaul link, its congestion can occur quite often. Therefore, the examples of the present invention may be useful in scenarios, where it may be expected that resource partitioning could not be done properly.

Further, in some of the examples proposed, the eNB may be responsible to negotiate handover thresholds. The estimated load on backhaul links may be also made available not only at the neighboring eNBs, but also at their RNs, in that case also RNs can take part to the negotiation. Loads on the backhaul links available also at neighboring eNBs and RNs can be also used for optimizing procedures like admission control, resource partitioning, etc.

FURTHER EXAMPLES

For the purpose of the present invention as described herein above, it should be noted that

- an access technology may be any technology by means of which a user equipment can access an access network (or base station, respectively). Any present or future technology, such as WiMAX (Worldwide Interoperability for Microwave Access) or WLAN (Wireless Local Access Network), BlueTooth, Infrared, and the like may be used; although the above technologies are mostly wireless access technologies, e.g. in different radio spectra, access technology in the sense of the present invention may also imply wirebound technologies, e.g. IP based access technologies like cable networks or fixed line.
- a network may be any device, unit or means by which a station entity or other user equipment may connect to and/or utilize services offered by the access network; such services include, among others, data and/or (audio-) visual communication, data download etc.;
- generally, the present invention may be applicable in those network/user equipment environments relying on a data packet based transmission scheme according to which data are transmitted in data packets and which are, for example, based on the Internet Protocol IP. The present invention is, however, not limited thereto, and any other present or future IP or mobile IP (MIP) version, or, more generally, a protocol following similar principles as (M)IPv4/6, is also applicable;
- a user equipment may be any device, unit or means by which a system user may experience services from an access network;
- method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;
- generally, any method step is suitable to be implemented as software or by hardware without changing the idea of the invention in terms of the functionality implemented;
- method steps and/or devices, units or means likely to be implemented as hardware components at the above-defined apparatuses, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may alternatively be based on any security architecture capable e.g. of authentication, authorization, keying and/or traffic protection;
- devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;
- an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

According to an example of the present invention, in a first aspect, this object is for example achieved by a method comprising:

deciding a handover of a terminal from a relaying source entity to a relaying target entity based on information related to at least one link between the relaying source and target entities and source and target network access entities.

According to further refinements of the example of the present invention as defined under the above first aspect,

- the method further comprises transmitting, prior to the deciding, second information related to a link between the terminal and the relaying source entity and a link between the terminal and the relaying target entity;
- the method further comprises transmitting, prior to the deciding, second information related to a link between a terminal and the relaying target entity, a link between the relaying target entity and the target network access entity, and a link between the relaying source entity and the source network access entity;
- the method further comprises transmitting, prior to the deciding, second information related to a link between the terminal and the relaying source entity;
- the method further comprises receiving, prior to the transmitting, at least a portion of the second information related to the link between the terminal and the relaying target entity;
- the method further comprises relaying the portion of the second information and information related to the link between the terminal and the relaying target entity and a link between the source network access entity and the relaying source entity;
- the method further comprises negotiating, after the deciding, a handover threshold for the terminal based on the information related to at least one link between the relaying source and target entities and the source and target network access entities;

the links between the relaying source and target entities and the source and target access entities are constituted by backhaul links;

the links between the relaying source and target entities and the terminal are constituted by access links;

the relaying source and target entities are constituted by relay nodes;

the source and target network access entities are constituted by evolved nodes B;

the information and the second information relate to link congestion;

the information and the second information comprise at least one of capacity information and quality information;

the quality information is constituted by one of modulation and coding scheme and average signal interference to noise ratio;

the capacity information comprises at least one of a link load and an available residual link capacity;

the link load imposed by downlink traffic is computed based measurements received from the relay nodes;

the link load imposed by uplink traffic is computed based on measurements by the evolved nodes B;

the available residual link capacity is indicated by physical resource blocks.

According to an example of the present invention, in a second aspect, this object is for example achieved by an apparatus comprising:

means for deciding a handover of a terminal from a relaying source entity to a relaying target entity based on information related to at least one link between the relaying source and target entities and source and target network access entities.

According to further refinements of the example of the present invention as defined under the above second aspect, the apparatus further comprises means for transmitting, from the relaying source entity to the source network access entity and prior to the deciding performed by the means for deciding, second information related to a link between the terminal and the relaying source entity and a link between the terminal and the relaying target entity;

the apparatus is constituted by a serving or source evolved node B;

the apparatus further comprises means for transmitting, from the source network access entity to the relaying source entity and prior to the deciding performed by the means for deciding, second information related to a link between a terminal and the relaying target entity, a link between the relaying target entity and the target network access entity, and a link between the relaying source entity and the source network access entity;

the apparatus is constituted by a serving or source relay node;

the apparatus further comprises means for transmitting, from the relaying source entity to the source network access entity and prior to the deciding performed by the means for deciding, second information related to a link between the terminal and the relaying source entity;

the apparatus is constituted by a serving or source relay node;

the apparatus further comprises means for receiving, prior to the transmitting performed by the means for transmitting, at least a portion of the second information related to the link between the terminal and the relaying target entity;

the apparatus is constituted by a target network access entity, and further comprises means for relaying the portion of the second information to the source network access entity and information related to the link between the terminal and the relaying target entity and a link between the source network access entity and the relaying source entity;

the apparatus further comprises means for negotiating, after the deciding performed by the means for deciding, a handover threshold for the terminal based on the information related to the at least one link between the relaying source and target entities and the source and target network access entities;

the links between the relaying source and target entities and the source and target access entities are constituted by backhaul links;

the links between the relaying source and target entities and the terminal are constituted by access links;

the relaying source and target entities are constituted by relay nodes;

the source and target network access entities are constituted by evolved nodes B;

the information and the second information relate to link congestion;

the information and the second information comprise at least one of capacity information and quality information;

the quality information is constituted by one of modulation and coding scheme and average signal interference to noise ratio;

the capacity information comprises at least one of a link load and an available residual link capacity;

the link load imposed by downlink traffic is computed based measurements received from the relay nodes;

the link load imposed by uplink traffic is computed based on measurements by the evolved nodes B;

the available residual link capacity is indicated by physical resource blocks;

at least one, or more of means for deciding, means for transmitting, means for receiving, means for relaying and means for negotiating and the apparatus is implemented as a chipset, module or subassembly.

According to an example of the present invention, in a third aspect, this object is for example achieved by an apparatus comprising:

a decider configured to decide a handover of a terminal from a relaying source entity to a relaying target entity based on information related to at least one link between the relaying source and target entities and source and target network access entities.

According to further refinements of the example of the present invention as defined under the above third aspect, the apparatus further comprises a transmitter configured to transmit, from the relaying source entity to the source network access entity and prior to the deciding performed by the decider, second information related to a link between the terminal and the relaying source entity and a link between the terminal and the relaying target entity;

the apparatus is constituted by a serving or source evolved node B;

the apparatus further comprises a transmitter configured to transmit, from the source network access entity to the relaying source entity and prior to the deciding performed by the decider, second information related to a link between a terminal and the relaying target entity, a link between the relaying target entity and the target network access entity, and a link between the relaying source entity and the source network access entity;

the apparatus is constituted by a serving or source relay node;
the apparatus further comprises a transmitter configured to transmit, from the relaying source entity to the source network access entity and prior to the deciding performed by the decider, second information related to a link between the terminal and the relaying source entity;
the apparatus is constituted by a serving or source relay node;
the apparatus further comprises a receiver configured to receive, prior to the transmitting performed by the transmitter, at least a portion of the second information related to the link between the terminal and the relaying target entity;
the apparatus is constituted by a target network access entity, and further comprises a relayer configured to relay the portion of the second information to the source network access entity and information related to the link between the terminal and the relaying target entity and a link between the source network access entity and the relaying source entity;
the apparatus further comprises a negotiator configured to negotiate, after the deciding performed by the decider, a handover threshold for the terminal based on the information related to the at least one link between the relaying source and target entities and the source and target network access entities;
the links between the relaying source and target entities and the source and target access entities are constituted by backhaul links;
the links between the relaying source and target entities and the terminal are constituted by access links;
the relaying source and target entities are constituted by relay nodes;
the source and target network access entities are constituted by evolved nodes B;
the information and the second information relate to link congestion;
the information and the second information comprise at least one of capacity information and quality information;
the quality information is constituted by one of modulation and coding scheme and average signal interference to noise ratio;
the capacity information comprises at least one of a link load and an available residual link capacity;
the link load imposed by downlink traffic is computed based measurements received from the relay nodes;
the link load imposed by uplink traffic is computed based on measurements by the evolved nodes B;
the available residual link capacity is indicated by physical resource blocks;
at least one, or more of a decider, a transmitter, a receiver, a relayer and a negotiator and the apparatus is implemented as a chipset, module or subassembly.

According to an example of the present invention, in a fourth aspect, this object is for example achieved by a computer program product comprising code means for performing a method according to the above first aspect.

According to an example of the present invention, in a fifth aspect, this object is for example achieved by a computer-readable storage medium encoded with instructions that, when executed by a computer, perform:
deciding a handover of a terminal from a relaying source entity to a relaying target entity based on information related to at least one link between the relaying source and target entities and source and target network access entities.

Although the present invention has been described herein before with reference to particular embodiments thereof, the present invention is not limited thereto and various modification can be made thereto.

The invention claimed is:

1. A method, comprising:
deciding a handover of a terminal from a relaying source entity to a relaying target entity based on first information related to:
at least one link between the relaying source entity and a source network access entity, and
at least one link between the relaying target entity and a target network access entity;
wherein the first information comprises link load, link capacity, link congestion, available link residual capacity, link quality, or any combination thereof; and
wherein, prior to the deciding, transmitting second information related to a link between the terminal and the relaying target entity, a link between the relaying target entity and the target network access entity, and a link between the relaying source entity and the source network access entity; and
performing the handover of the terminal from the relaying source entity to the relaying target entity.

2. The method according to claim 1, further comprising transmitting, prior to the deciding, third information related to a link between the terminal and the relaying source entity.

3. The method according to claim 1, further comprising relaying a portion of the second information and information related to a link between the source network access entity and the relaying source entity.

4. The method according to claim 1, further comprising negotiating, after the deciding, a handover threshold for the terminal based on the information related to the at least one link between the relaying source and target entities and the source and target network access entities.

5. The method according to claim 1, wherein at least one of the following applies:
the links between the relaying source and target entities and the source and target access entities are constituted by backhaul links;
the links between the relaying source and target entities and the terminal are constituted by access links;
the relaying source and target entities are constituted by relay nodes;
the source and target network access entities are constituted by evolved nodes B;
the quality information is constituted by one of modulation and coding scheme and average signal interference to noise ratio;
the link load imposed by downlink traffic is computed based on measurements received from the relay nodes;
the link load imposed by uplink traffic is computed based on measurements by the evolved nodes B; and
the available residual link capacity is indicated by physical resource blocks.

6. A computer program product embodied on a non-transitory computer-readable medium, in which a computer program is stored which, when being executed by a computer, comprises code for performing the method of claim 1.

7. An apparatus, comprising:
at least one processor, and
at least one memory including computer program code,
wherein the at least one memory and the computer code are configured, with the at least one processor, to cause the apparatus to at least perform the following:

deciding a handover of a terminal from a relaying source
entity to a relaying target entity based on first information related to:
at least one link between the relaying source entity and a source network access entity, and
at least one link between the relaying target entity and a target network access entity;
wherein the first information comprises link load, link capacity, link congestion, available link residual capacity, link quality, or any combination thereof; and
wherein, prior to the deciding, transmitting second information related to a link between the terminal and the relaying target entity, a link between the relaying target entity and the target network access entity, and a link between the relaying source entity and the source network access entity; and
performing the handover of the terminal from the relaying source entity to the relaying target entity.

8. The apparatus according to claim 7, wherein the at least one memory and the computer code are further configured, with the at least one processor, to cause the apparatus to at least perform the following:
transmitting, from the relaying source entity to the source network access entity and prior to the deciding, third information related to a link between the terminal and the relaying source entity.

9. The apparatus according to claim 8, wherein the apparatus is a serving or source evolved node B.

10. The apparatus according to claim 8, wherein the at least one memory and the computer code are further configured, with the at least one processor, to cause the apparatus to at least perform the following:
receiving, prior to the transmitting, at least a portion of the second information related to the link between the terminal and the relaying target entity.

11. The apparatus according to claim 10, wherein the apparatus is a target network access entity, and wherein the at least one memory and the computer code are further configured, with the at least one processor, to cause the apparatus to at least perform the following:
relaying the portion of the second information to the source network access entity and information related to the link between the terminal and the relaying target entity and a link between the source network access entity and the relaying source entity.

12. The apparatus according to claim 7, wherein the at least one memory and the computer code are further configured, with the at least one processor, to cause the apparatus to at least perform the following:
transmitting, from the source network access entity to the relaying source entity and prior to the deciding, the second information related to the link between the terminal and the relaying target entity, the link between the relaying target entity and the target network access entity, and the link between the relaying source entity and the source network access entity.

13. The apparatus according to claim 12, wherein the apparatus is a serving or source relay node.

14. The apparatus according to claim 7, wherein the at least one memory and the computer code are further configured, with the at least one processor, to cause the apparatus to at least perform the following:
transmitting, from the relaying source entity to the source network access entity and prior to the deciding, the second information related to the link between the terminal and the relaying source entity.

15. The apparatus according to claim 14, wherein the apparatus is a serving or source relay node.

16. The apparatus according to claim 7, wherein the at least one memory and the computer code are further configured, with the at least one processor, to cause the apparatus to at least perform the following:
negotiating, after the deciding, a handover threshold for the terminal based on the information related to the at least one link between the relaying source and target entities and the source and target network access entities.

17. The apparatus according to claim 7, wherein at least one of the following applies:
the links between the relaying source and target entities and the source and target access entities are backhaul links;
the links between the relaying source and target entities and the terminal are access links;
the relaying source and target entities are relay nodes;
the source and target network access entities are evolved nodes B;
the quality information is one of modulation and coding scheme and average signal interference to noise ratio;
the link load imposed by downlink traffic is computed based on measurements received from the relay nodes;
the link load imposed by uplink traffic is computed based on measurements by the evolved nodes B; and
the available residual link capacity is indicated by physical resource blocks.

18. A method, comprising:
deciding a handover of a terminal from a relaying source entity to a relaying target entity based on first information related to a serving backhaul link, a target backhaul link, a serving access link, and a target access link,
wherein a backhaul link is a link between a relaying entity and a network access entity,
wherein an access link is a link between a terminal and a relaying entity, and
wherein the first information comprises link load, link capacity, link congestion, available link residual capacity, link quality, or any combination thereof, and
wherein, prior to the deciding, transmitting second information related to the target access link, the target backhaul link, and the source backhaul link; and
performing the handover of the terminal from the relaying source entity to the relaying target entity.

* * * * *